United States Patent [19]
Japikse et al.

[11] 3,930,053
[45] Dec. 30, 1975

[54] RAPIDLY DISSOLVING DRY BEVERAGE MIX

[75] Inventors: Cornelis Hendrikus Japikse, Springfield Township, Hamilton County; Gyanendra Singh, Fairfield; Timothy J. Kennedy, Springfield Township, Hamilton County, all of Ohio

[73] Assignee: The Procter & Gamble Company, Cincinnati, Ohio

[22] Filed: July 17, 1974

[21] Appl. No.: 489,278

[52] U.S. Cl. .................................. 426/590
[51] Int. Cl.² ............................. A23L 2/00
[58] Field of Search .......... 426/464, 477, 470, 471, 426/380, 365, 366, 590

[56] References Cited
UNITED STATES PATENTS

| | | | |
|---|---|---|---|
| 2,981,629 | 4/1961 | Ginnette et al. | 426/470 |
| 3,241,977 | 3/1966 | Mitchell et al. | 426/191 |
| 3,632,354 | 1/1972 | Swaine | 426/366 |
| 3,667,962 | 6/1972 | Fritzberg et al. | 426/191 |

*Primary Examiner*—Raymond N. Jones
*Attorney, Agent, or Firm*—Lawrence J. Klich; Leonard Williamson

[57] ABSTRACT

A process for preparing an extremely rapidly dissolvable dry beverage mix by admixing the beverage flavor base with the beverage sugar content to form a slurry having a high total solids content and drying the slurry.

6 Claims, No Drawings

RAPIDLY DISSOLVING DRY BEVERAGE MIX

BACKGROUND OF THE INVENTION

This invention relates to food products, and more particularly, to aqueous beverages prepared by adding a dry flavor mix to water and dissolving the dry mix therein. These aqueous beverages may either be consumed as such, or, more typically, carbonated to provide sparkling, effervescent soft drinks.

The market for carbonated beverage has increased at a dramatic rate, and today is a multi-billion dollar industry. Up to the present, this market has been served almost exclusively by beverages which are pre-carbonated to the proper level for immediate consumption and then packaged in bottles or cans. While carbonation of beverages at the point of consumption, such as soda fountains, has been practiced for years, preparation of point-of-consumption individual servings of carbonated beverages in the home has not thus far been greeted with wide acceptance.

One method of making carbonated beverages in the home involves the dilution of flavor syrups to the proper concentration and carbonating the resulting solution, such as would be done at a soda fountain. However, such an approach is overly burdensome for the volume of carbonated beverages consumed in the home, involves the procurement and correct dilution of the flavor syrups, and hence has not met with wide popularity. Another method of making carbonated beverages in the home involves the use of dry mixes containing flavors and sugars along with a gas generation system. This type of drink has also not gained wide consumer acceptance because products marketed thus far have not afforded the consumer a quality alternative to precarbonated bottled beverages.

One large disadvantage of current dry beverage mixes is the relatively slow dissolution rate of the dry mix when added to water. Conventional dry beverage mixes often take up to 5 or 10 minutes to completely dissolve, and even then, some mixes leave an unsightly residue of undissolved particles or a semi-dissolved sticky material at the bottom of the drinking vessel. Also, conventional mixes typically require mechanical agitation to achieve complete dissolution and the uniform concentration throughout the beverage. As is evident from the lack of substantial market volume, compared to pre-carbonated, bottled beverages, this extra preparation time and effort for conventional dry beverage mixes is extremely disadvantageous to the consumer who turns to a carbonated beverage as a readily accessible and convenient item of cold, liquid refreshment.

It is, therefore, an object of the present invention to form a dry beverage mix having an extremely rapid dissolution rate upon contact with water and which requires only a minimum amount of agitation for dissolution in an aqueous solution to from a beverage in a short period of time.

It is also an object of the present invention to furnish the consumer with a convenient method for preparing carbonated beverages equal in level and quality of flavor and carbonation to pre-carbonated, bottled beverages.

These and other objects of the present invention will become readily apparent to those skilled in the art from a reading of the disclosure and appended claims which follow.

SUMMARY OF THE INVENTION

The present invention provides a dry, rapidly dissolvable beverage mix for beverage flavor bases which utilize sugar as the sweetening agent. This is accomplished by producing a slurry of the flavor base and all of the beverage sugar content and drying this slurry by vacuum techniques. In producing this slurry, it is important that the flavor base:sugar ratio and the total solids content be kept within certain ranges in order that a rapidly dissolvable dry beverage mix be obtained. Upon subsequent contact with water, the particles rapidly dissolve with a minimum of agitation to form a flavorful, sweetened beverage.

DETAILED DESCRIPTION OF THE INVENTION

As used herein, the term "flavor base" is intended to cover all flavoring materials present in a beverage with the exception of the sweetening agent and any acid. While both the sweetening agent and the acid do influence markedly the flavor of a given beverage, the characteristic flavor results from the flavoring materials added. These flavoring materials come in the form of alcoholic extracts or essences, aqueous solutions and emulsions, solutions of flavors in glycerol and propylene glycol, and fruit-juice concentrates. Beverage flavor ingredients of an essential-oil character often require extraction with alcohol from the source raw material. Water-soluble flavoring components can be made as aqueous solutions. When necessary, due to the low water solubility, emulsions can be prepared or solutions in glycerol or propylene glycol can be made. Such emulsions or solutions avoid the use of alcohol. Concentrated fruit juices are used in preference to fruit juices themselves, for on dilution with water, greater fidelity or fruit flavor can be obtained. Also, as used herein, the term "sugar" is intended to be generic to cover not only sucrose, the sugar most commonly used in the production of beverages, but also includes dextrose (D-glucose), fructose (levulose), liquid sugar (either sucrose or an invertsucrose blend), invert sugar (a 50—50 blend of dextrose and fructose), lactose or maltose.

The flavoring materials are typically used as a flavor concentrate, or "flavor base," of a given concentration. A beverage is obtained by diluting the flavor base to the proper strength for a particular beverage and incorporating the proper sugar content for that beverage. Of course, if the beverage is obtained from a dry mix, the sugar content and flavor base will conventionally be mixed together in a dry mix which is then dissolved in the proper amount of water. A carbonated beverage may be obtained by adding such a dry mix to precarbonated water, or by adding the dry mix to plain water, such as tap water or the like, and then carbonating this aqueous solution.

Formulations for various flavor bases are well known to those skilled in the art and may readily be obtained from published sources. For example, Merory, Food Flavorings, The Avi Publishing Co., (1960), lists various flavor base formulations in Chapter 17, entitled "Syrup and Soda Flavorings"; also, in Jacobs, M.B., Manufacture and Analysis of Carbonated Beverages, Chemical Publishing Company (1959), formulations for many fruit and non-fruit flavor bases are given. Complete flavor bases are also commercially available in standardized concentrations for ease in dilution to the proper concentration for the final beverage. These are commonly known as "2-ounce" or "4-ounce" flavor bases depending upon the amount of the base which must be added to a gallon of simple syrup which is then diluted with water to the final beverage strength. (As those skilled in the art will appreciate, a simple syrup is a solution of sugar in water, usually in a standard concentration). Commercially obtained flavor bases are typically about 50 percent solvent, usually water or ethanol, with the flavoring material typical for a particular flavor dissolved therein.

In accordance with the present invention, the flavor base, containing all the flavoring materials necessary for a particular beverage, is admixed with the total sugar content required for that amount of flavor base to form a thoroughly admixed homogenous slurry. It has been found that in order to obtain the rapidly dissolving dry mix particles of the present invention, it is necessary that the flavor base/sugar slurry have a total solids content of from about 75 to about 95 percent, by weight, and preferably, from about 85 to about 94 percent, so that the beverage mix produced from the slurry is able to be dried in the proper physical form to achieve rapid dissolution of the particles. In this regard, it is often necessary to add a small amount of water to achieve the best consistency for admixing. Only so much water as is necessary for these purposes should be added since it is important that the total solids concentration be maintained in the range as set forth above. If too much water is added to the mixture, the flavoring materials in the flavor base will separate into oil and water layers resulting in a non-uniform flavored product. At the other extreme, at moisture levels of below about 5 percent, the necessary dispersion of flavor base and sugar does not take place.

In the practice of the present invention, it is also important that the flavor base:sugar ratio, by weights, be from about 0.03 to about 0.15, in order to assure the production of rapidly dissolving flavor particles. While the specific optimum ratio will vary for different flavoring systems due to different bases and flavoring materials used, the ratio for all known flavoring systems will fall within the above range. Thus, any specific optimum ratio can easily be determined by one skilled in the art in light of the present specification.

The flavor base/sugar mixture is blended together to provide a slurry, or "slush", before drying. It has been found that any type of conventional mixing means may be used for blending the mixture as long as a thorough mixing is achieved. It is preferred, however, that the mixing means employed does not beat into the slurry an abundance of air since such an abundance of air will cause an unstable foam during drying and correspondingly, a very low density in the final dried product. Also, it is preferred that the temperature of the slurry be kept below about 100°F during admixture to avoid any loss of volatiles or heat degradation of flavor materials. With these considerations in mind, it is thus recommended that low-shear mixing means be employed, since these will not beat in an abundance of air and will impart less energy to the mixture, and correspondingly, less heat.

Various substances may optionally be added to the mixture in processing it in accordance with the present invention to provide such a dry beverage mix. The only criterion that limits the possible inclusion of any optional ingredients is that it must be acceptable for use in edible food products. Other than this restriction, only the appearance of an undesirable off-taste or off-color for a particular beverage will place a practical limitation on the addition of any desired material. As those skilled in the art will appreciate, the variety of different materials which may be added is extremely broad indeed. For example, the present invention is concerned with a dry beverage mix which will be dissolved in water at the point of consumption. In doing this, the consumer will most likely use tap water which is slightly alkaline due to the mineral salts dissolved therein. Thus, to neutralize this alkalinity, an edible acid may be needed to achieve the same beverages pH as that achieved when distilled or de-ionized water is used as the beverage base. Any common food acid, such as citric, malic, or phosphoric may be used for this purpose. Of course, if phosphoric acid is used, it must be properly dried, as will be detailed hereinafter. Other materials which may be used include various additional flavoring ingredients which may be added to the commercial flavor base to modify its flavor, accentuate any especially preferred flavor notes, or replace any flavor notes which may be volatilized and lost during processing into a dry mix. Some of the more common flavoring ingredients which can be added to common beverages, such as a cola beverage, include, for example, extract of coca leaves, neroli oil, lime oil, lemon oil, orange oil, nutmeg oil, vanilla extract or cassia oil. Other flavoring materials for colas or any other desired beverage may be found in published formulation recipes for the particular beverage flavor desired. Other types of materials, such as food colorings, for example, U.S. Certified Food Colors or caramel coloring; stimulants, for example, caffeine; artificial sweeteners, for example, saccharin; bodying agents, for example, sorbitol or sodium carboxymethylcellulose; foaming agents, for example, licorice root extract or saponin-bearing extract of soaproot; or preservatives, for example, sodium benzoate, propylene glycol or ascorbic acid may advantageously be added to the flavor base to achieve the respective desired results. Alternatively, if the flavor base is formulated specifically for processing into a dry beverage mix in accordance with the present invention, standard flavor base formulations may be directly adapted for use by the addition of any desired optional ingredient not set forth in the standard formulation.

The admixture of flavor base, sugar and any optional ingredients is then dried to substantial dryness using conventional vacuum or freeze drying techniques to produce a dry beverage mix. As used herein, "substantial dryness" is the state at which the dried material feels dry to the touch, is free-flowing after being ground, and can be packaged similarly to conventional powders or granules without coating on or adhering to the package side walls. This will typically involve drying to a final moisture content of less than about 3 percent, preferably, to less than about 1 percent, and most preferably, to about 0.1 percent. In keeping with the present invention, it is important that the slurry be dried by vacuum drying, or equivalent techniques, which cause the drying material to form a stable foam so as to form a beverage mix which is rapidly dissolvable in water requiring only a minimum amount of agitation. In the practice of the present invention, the slurry is placed in a relatively thin layer on a belt, conveyor, or on trays and dried under vacuum conditions. The slurry may be frozen before drying, but in any event, it is important that the integrity of the physical structure be retained during the vaporization of moisture. Specific vacuum drying techniques are known to those skilled in the art and will not be repeated herein for purposes of brevity. It has been found that best results are obtained if the slurry is dried within a period of about 8, and preferably about 3 hours, and that the temperature of the slurry is not raised above 100°F and preferably above 50°F during the drying process. In the practice of the present invention, it has been found that conventional freeze drying techniques are equivalent to the vacuum drying techniques and the results obtained and thus may be advantageously employed. Freeze drying basically involves freezing to temperatures of about −10°F to about −40°F and removing the water by sublimation as the frozen slurry is gradually warmed under vacuum conditions. Again, any of the conventional freeze drying techniques known to those skilled in the art are suitable for the practice of the present invention as long as a stable foam is produced from the slurry during dehydration.

The dried product resulting from the dehydration step is then ground by conventional size reduction techniques so as to make it more readily dissolvable when added to water and to enhance the appearance of the final product. Depending upon the fineness to which the particles are ground, they may either be screened to obtain groups of approximately uniform particle size, or the dried mix may be ground to a fine particle size and agglomerated using conventional agglomeration techniques. After grinding to a suitable particle size, the dry stable beverage mix particles are packaged in suitable aliquot portions for subsequent dissolution in a predetermined amount of water to obtain flavorful beverage ready for either carbonation or direct consumption.

The dry particles resulting from the practice of the present invention are unique in that a flavorful, sweetened beverage results within one minute after their addition to water and a minimum of agitation, whereas with conventional dry beverage mixes, prolonged mixing and a waiting time of at least several minutes is necessary before the mix is fully dissolved. The dry beverage particles of the present invention are further distinguished from conventional mixes in their appearance. Since the sugar crystals are uniformly coated with a flavor base/sugar mixture before drying, the dried product has a uniform color. Of course, the color will vary for different flavors and the food coloring added for the respective flavors, but due to the manner of drying the slurry, each flavor will retain a deep, rich color typical of that beverage flavor. This is in marked contrast to conventional dry mixes, which either have a "speckled" appearance due to the separate particles of sugar and colored flavor, or have a uniform "bland" appearance with no noticeable color provided for aesthetic appeal to the consumer.

Although applicants do not wish to be bound to any specific theory in the practice of their invention, it is theorized that the extremely rapid dissolution rate of the dry flavor particles of the instant invention is due to the unique slurry which is dried by conventional techniques. Since the flavor base is admixed with the entire beverage sugar content in a slurry having an unusually high solids content, it is theorized that only a portion of the sugar crystals dissolve and that this dissolved sugar/flavor base admixture uniformly coats the remaining sugar crystals. Upon drying, the sugar crystals are thus uniformly coated with a flavor base/sugar admixture in an amorphous physical form. This amorphous physical form is less structurally stable than the normal crystalline form of sugar and rapidly breaks down in the presence of water, or is thus rapidly dissolvable in water. This amorphous coating, or outer layer, would also account for the uniform texture and rich, darker appearance of the dry particles of the present invention.

The dry particles of the present invention may be added to water and immediately consumed as a flavorful, sweetened drink, or may be made a part of a dry carbonated beverage mix. If the dry flavor particles of the present invention are to be used in a dry mix adapted for making carbonated beverages, the particles may be advantageously employed with a variety of carbonation systems to provide suitably carbonated, flavorful beverages. For instance, the dry beverage particles as disclosed herein can be added to pre-carbonated water, or, the dry beverage particles can be combined with an economical point-of-consumption carbonation system and this combination then added to tap water to provide a convenient, carbonated beverage. Examples of suitable sources of pre-carbonated water are the use of bottled precarbonated water, commonly known as "club soda" or the use of pressure carbonators which utilize $CO_2$-charged cylinders to carbonate water as it is dispensed, such as is done at a soda fountain. Examples of point-of-consumption systems which utilize regular tap water for the beverage include the use of a "chemical couple" such as those disclosed in Mitchell et al., U.S. Pat. No. 3,241,977, issued Mar. 22, 1966, or Hovey, U.S. Pat. No. 3,492,671, issued Jan. 27, 1970; or the use of $CO_2$-loaded zeolite molecular sieves, such as that disclosed in pending U.S. pat. application, Ser. No. 302,149, filed Oct. 30, 1972 and incorporated herein by reference in its entirety.

The latter-named carbonation system, i.e., the use of $CO_2$-loaded zeolite molecular sieves, is especially preferred in the practice of the present invention. Molecular sieves of this type are crystalline aluminosilicate materials of the following general formula:

$$M_{2/n}O \cdot SiO_2 \cdot aAl_2O_3 \cdot bH_2O$$

in the salt form, where $n$ is the valence of a metal cation M, M ordinarily is Na or K but may be other cations substituted by exchange, $a$ is the number of moles of alumina, and $b$ is the number of moles of water of hydration. Due to the crystalline nature of such materials, the diameters of the surface cavities and of the internal pores are substantially constant and are of molecular magnitude. For this reason, the crystalline aluminosilicates have found wide use in the separation of materials according to molecular size or configuration, hence the name molecular sieves. Upon removal of at least some of the water of hydration by heating, the crystalline aluminosilicates become highly porous and are characterized by a series of surface cavities and internal pores which form an interconnecting network of passageways within the crystal. Such dehydrated molecular sieves are often referred to as "activated," meaning that they are ready to selectively absorb molecules of a given size. Carbon dioxide is strongly absorbed, or "loaded," on such sieves, but can subsequently be displaced by the stronger and preferential absorption of water. Hence, the release of absorbed $CO_2$ from molecular sieves upon contact with an aqueous potable liquid provides a convenient and economical point-of-consumption beverage carbonation system. By employing molecular sieves loaded with carbon dioxide to the extent of at least 5 percent by weight of the molecular sieves and by carbonating a beverage at temperatures of from about 35°F to about 70°F (the temperature of the beverage) and atmospheric pressures, suitably carbonated beverages can be obtained in about 1-10 minutes. As might be expected, increasing the quantity of molecular sieves employed for a given amount of beverage solution increases the amount of carbon dioxide released. Although the optimum amount of molecular sieves employed will vary with the characteristics of the particular sieve type employed and the beverage solution to be carbonated, the preferred quantity of molecular sieves ranges from about 0.5 gram to about 4 grams of molecular sieves (before loading) per fluid ounce of beverage to be carbonated.

It is important that the dry flavor particles of the present invention be packaged in a moisture-proof container, in that the particle physical structure collapses when wetted, due to the extremely rapid dissolution rate. A convenient method for insuring that these flavor particles are not degraded by exposure to moisture during storage periods is to have them packaged in the presence of a desiccant. The $CO_2$-loaded molecular sieves disclosed in the above-mentioned pending U.S. pat. application is a suitable desiccant for such purposes. Thus, the presence of such $CO_2$-loaded zeolite molecular sieves in combination with the dry flavor mix has multiple advantages in that they provide protection of the flavor particles during storage, provide a convenient and sufficient carbonation system during use, and the effervescent action resulting from the molecular sieves immersed in water is sufficient to provide adequate agitation for the dissolution of the dry flavor particles of the instant invention.

If dry cola flavor particles are desired, it is desirable that a mono-alkali orthophosphate be added to the cola base containing phosphoric acid, in accordance with copending application of Timothy J. Kennedy, entitled "Dry Stable Instant Beverage Mix," filed on July 17, 1974, Ser. No. 489,291.

The following Examples serve to illustrate various embodiments of the invention and are not intended to limit the invention in any way.

EXAMPLE I

To 242 parts of granulated sugar (baker's sucrose), 20 parts of a commercially available orange flavor base and 10 parts water were added and thoroughly admixed. The resultant slurry had a flavor base:sugar ratio of 0.083 and an 89 percent total solids concentration. The slurry was spread in a layer about ¼ inch thick and placed in a Stokes freeze dryer at about 75°F. Without precooling, the slurry was dried for 3 hours at 75°F at 1 mm Hg absolute. The dry stable foam resulting from this operation was then ground and passed through U.S. Standard Sieve screens of 7 and 12 mesh to select particles of the desired size range.

Twenty-five grams of the dry flavor particles were then placed in an 8-ounce glass, along with an operable amount of $CO_2$-loaded zeolite molecular sieves, these being prepared following the teachings of pending U.S. patent application, Ser. No. 302,149, filed Oct. 30, 1972, now U.S. Pat. No. 3,888,998. Tap water at a temperature of 60°F and ice cubes were added to the glass and after 30 seconds, 90 percent of the flavor particles had completely dissolved, as measured by a refractometer, with the only agitation provided by the effervescence of the molecular sieves, and after 1 minute, a fully carbonated, cold, flavorful cola beverage was produced.

A flavorful, sweetened orange drink is obtained after one minute when 25 grams of the dry flavor particles are placed in an 8-ounce glass and tap water and ice cubes added to the mix. The agitation provided by the addition of tap water is sufficient to cause dissolution of the flavor particles and a uniform concentration of flavor in the final beverage.

EXAMPLE II

Fifty-seven parts of monosodium phosphate was dissolved in 440 parts distilled water. This mixture was added to 312 parts of a commercially available 2-ounce cola flavor base, to which 15 parts of 85 percent phosphoric acid had been added. The resulting mixture was then added to 8000 parts of granulated sugar (baker's sucrose) to form a slurry having a total solids content of about 93 percent and a flavor base:sugar ratio of about 0.039. This slurry was spread about ¼ inch thick in freeze dryer trays and cooled to −10°F, at which temperature the slurry was frozen. The frozen slurry was then dried in a Stoke's freeze dryer in three temperature increments of −50°F, +50°F and 75°F for ½ hour, 4 hours and 2½ hours, respectively, to form a dry, stable foam. This foam was ground in a two-roll mill and screened to obtain particles of the desired size range.

Twenty-five grams of the resulting dry flavor beverage mix and an operable amount of aluminosilicate molecular sieves, loaded with $CO_2$ in accordance with the teachings of pending U.S. pat. application, Ser. No. 302,149, filed Oct. 30, 1972, and now U.S. Pat. No. 3,888,998 were placed in an 8-ounce glass. Tap water at a temperature of 60°F and ice cubes were added to make an 8-ounce beverage serving. The molecular sieves immediately began to effervesce and 90 percent of the flavor and sugar particles were fully dissolved within 30 seconds, as measured by a refractometer, and all flavor and sugar particles were completely dissolved within 1 minute. The only agitation was provided by the effervescence of the aqueous solution being carbonated by the molecular sieves. After the 1 minute mixing time, a flavorful, fully carbonated cola beverage resulted which appeared to be equal in carbonation and intensity of acid taste as cola beverages obtained from commercially available pre-carbonated bottled colas.

Thus, it is apparent that there has been provided, in accordance with the present invention, a dry, rapidly dissolvable instant beverage mix that fully satisfies the objects, aims, and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. A process for preparing a rapidly dissolvable and substantially dry beverage flavor mix comprising:
  a. forming a slurry by admixing a flavor base with sugar crystals in an amount such that said admixture has a flavor base: sugar ratio of about 0.03 to about 0.15 and said slurry admixture has a total solids concentration of from about 75 to about 95 percent;
  b. drying said slurry admixture to substantial dryness in a manner in which to form a stable foam; and c. grinding said stable foam to form discrete dry beverage flavor particles.

2. The process of claim 1 wherein the total solids concentration of said admixture is from about 80 to about 94 percent.

3. The process of claim 1 wherein said admixture is dried to a final moisture content of less than about 3 percent.

4. The process of claim 3 wherein said admixture is dried to a final moisture content of less than about 1 percent.

5. The product prepared by the process of claim 1.

6. The process of claim 1 wherein said sugar is sucrose.

* * * * *